US010592925B2

United States Patent
Dennett et al.

(10) Patent No.: US 10,592,925 B2
(45) Date of Patent: Mar. 17, 2020

(54) MERCHANT MANAGEMENT SYSTEM FOR ADAPTIVE PRICING

(71) Applicant: Jet.com, Inc., Hoboken, NJ (US)

(72) Inventors: Zachary Dennett, New York, NY (US); Nathan Thomas Faust, Chatham, NJ (US); Michael Thomas Hanrahan, Ridgewood, NJ (US); Marc Eric Lore, Mountain Lakes, NJ (US)

(73) Assignee: JET.COM, INC., Hoboken, NJ (US)

( * ) Notice: Subject to any disclaimer, the term of this patent is extended or adjusted under 35 U.S.C. 154(b) by 374 days.

(21) Appl. No.: 15/472,069

(22) Filed: Mar. 28, 2017

(65) Prior Publication Data

US 2017/0278132 A1   Sep. 28, 2017

Related U.S. Application Data

(60) Provisional application No. 62/314,368, filed on Mar. 28, 2016.

(51) Int. Cl.
*G06Q 30/02* (2012.01)
*G06Q 30/06* (2012.01)

(52) U.S. Cl.
CPC ..... *G06Q 30/0253* (2013.01); *G06Q 30/0605* (2013.01); *G06Q 30/0633* (2013.01)

(58) Field of Classification Search
CPC ................................................. G06Q 30/02
See application file for complete search history.

(56) References Cited

U.S. PATENT DOCUMENTS

| | | | |
|---|---|---|---|
| 8,556,176 B2 | 10/2013 | Van Horn et al. |
| 8,630,923 B2 | 1/2014 | Rothman |
| 2008/0235147 A1 | 9/2008 | Jensen |
| 2009/0164338 A1 | 6/2009 | Rothman |
| 2012/0116897 A1 | 5/2012 | Klinger et al. |
| 2013/0046610 A1 | 2/2013 | Abraham |

(Continued)

FOREIGN PATENT DOCUMENTS

WO    WO2017015212 A1    1/2017

OTHER PUBLICATIONS

ISR for corresponding Int'l Application No. PCT/US2016/042807 Oct. 4, 2016.

*Primary Examiner* — Marilyn G Macasiano
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of determining a prospective product for a user to add to an cart, identifying a prospective cart merchant group that includes prospective merchants that offer the prospective product, determining a prospectively-unlocked product group that includes a plurality of products offered by the prospective merchants that are discounted if the prospective product is added to the electronic cart, determining a savings score for the prospectively-unlocked product group, and coordinating displaying to the user on the website of the online retailer (1) the prospective product and (2) the savings score of the prospectively-unlocked product group.

22 Claims, 7 Drawing Sheets

(56) References Cited

U.S. PATENT DOCUMENTS

| | | | |
|---|---|---|---|
| 2013/0132238 A1* | 5/2013 | Evans | G06Q 30/0639 705/26.61 |
| 2013/0166360 A1 | 6/2013 | Kshetramade et al. | |
| 2017/0018013 A1 | 1/2017 | Faust et al. | |

* cited by examiner

500

---

505 – Identifying products in an electronic cart of a user on a website of an online retailer.

↓

510 – Identifying a current cart merchant group for the electronic cart of the user, the current cart merchant group comprising current merchants that offer the products in the electronic cart of the user.

↓

515 – Identifying a currently-unlocked product group, the currently-unlocked product group comprising current products offered by the current cart merchant group.

↓

520 – Determining a prospective product for a user to add to the electronic cart.

↓

525 – Identifying a prospective cart merchant group, the prospective cart merchant group comprising prospective merchants that offer the prospective product.

↓

530 – Determining a prospectively-unlocked product group, the prospectively-unlocked product group comprising a plurality of products offered by the one or more prospective merchants that are discounted if the prospective product is added to the electronic cart.

↓

535 – Comparing the prospectively-unlocked product group to the currently-unlocked product group to determine a modified unlocked product group.

↓

540 – Determining a savings score of at least a portion of the prospectively-unlocked product group.

↓

545 – Coordinating displaying to the user on the website of the online retailer (1) the prospective product and (2) the savings score of the at least the portion of the prospectively-unlocked product group.

FIG. 5

MERCHANT MANAGEMENT SYSTEM FOR ADAPTIVE PRICING

CROSS-REFERENCE TO RELATED APPLICATIONS

This application claims the benefit of U.S. Provisional Application No. 62/314,368, entitled "Management System for Adaptive Pricing" and filed Mar. 28, 2016, the disclosures of which are all herein incorporated by reference.

TECHNICAL FIELD

This disclosure relates generally to adaptively pricing products from a plurality of merchants.

BACKGROUND

Many consumers opt to use online shopping in addition to or in lieu of physically going to a store to buy products. Online shopping allows consumers to conveniently purchase products remotely, which in turn makes it easier to shop for the lowest prices and purchase products from multiple merchants. Merchant marketplaces facilitate the sale of products by multiple merchants by providing a single place for different merchants to sell their products. Oftentimes, multiple merchants offer the same product but at different prices. In these situations, merchant marketplaces often make the lowest price most prominent.

However, these prices are set generally, not tailored to the consumer that is purchasing the product. Because of this, merchants and/or merchant marketplaces have to make sure that the price they are offering adequately covers known contingencies. For example, if the merchant offers free shipping, they need to make sure that they add enough to the base price of the product to cover the maximum (or in some cases, average) shipping cost. However, even if the actual cost to ship the product to consumer is lower than the shipping cost that is included in the product price, the consumer still pays that amount instead of having those savings passed down to them.

BRIEF DESCRIPTION OF THE DRAWINGS

To facilitate further description of the embodiments, the following drawings are provided in which:

FIG. 5 is a flowchart for a method, according to one embodiment;

Figure 1:
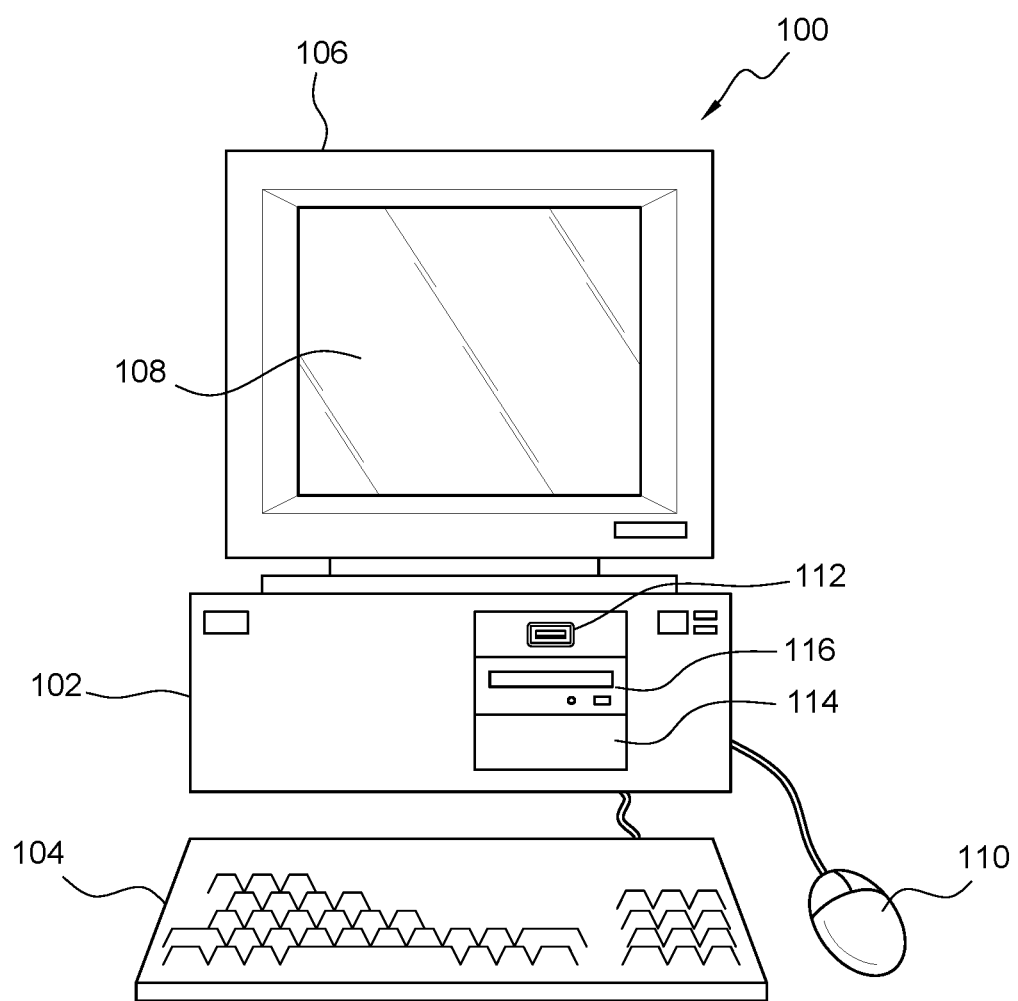
FIG. 1 illustrates a front elevational view of a computer system that is suitable for implementing various embodiments of the systems disclosed in FIGS. 3 and 4.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include a merchant management system comprising one or more processing modules and one or more non-transitory storage modules storing computing instructions configured to run on the one or more processing modules. The one or more storage modules can be configured to run on the one or more processing modules and perform the act of determining one or more prospective products for a user to add to an electronic cart on a website of an online retailer. The one or more storage modules also can be configured to run on the one or more processing modules and perform, for each prospective product of the one or more prospective products, the act of identifying a prospective cart merchant group. The prospective cart merchant group can comprise one or more prospective merchants that offer the prospective product. The one or more storage modules also can be configured to run on the one or more processing modules and perform, for each prospective product of the one or more prospective products, the act of determining a prospectively-unlocked product group. The prospectively-unlocked product group can comprise a plurality of products offered by the one or more prospective merchants that are discounted if the prospective product is added to the electronic cart. The one or more storage modules also can be configured to run on the one or more processing modules and perform, for each prospective product of the one or more prospective products, the act of determining a savings score of at least a portion of the prospectively-unlocked product group. The one or more storage modules also can be configured to run on the one or more processing modules and perform, for each prospective product of the one or more prospective products, the act of coordinating displaying to the user on the web site of the online retailer (1) the prospective product and (2) the savings score of the at least the portion of the prospectively-unlocked product group.

Various embodiments include a method. The method can include determining, with a merchant management system, one or more prospective products for a user to add to an electronic cart on a website of an online retailer. The method also can include, for each prospective product of the one or more prospective products, identifying, with a merchant management system, a prospective cart merchant group. The prospective cart merchant group can comprise one or more prospective merchants that offer the prospective product. The method also can include, for each prospective product of the one or more prospective products, determining, with a merchant management system, a prospectively-unlocked product group. The prospectively-unlocked product group can comprise a plurality of products offered by the one or more prospective merchants that are discounted if the prospective product is added to the electronic cart. The method also can include, for each prospective product of the one or more prospective products, determining, with a merchant management system, a savings score of at least a portion of the prospectively-unlocked product group. The method also can include, for each prospective product of the one or more prospective products, coordinating, with a merchant management system, displaying to the user on the website of the online retailer (1) the prospective product and (2) the savings score of the at least the portion of the prospectively-unlocked product group.

In many embodiments described herein, a merchant management system facilitates the sale of products from merchants to users of client devices and optimizes the selection of merchants and products. The merchant management system can evaluate prospective products that can be purchased by a user to determine which of these prospective products will result in increased savings or increased savings potential for the user. The merchant management system can present products available at the various merchants to a user and also can provide a portal for selecting and purchasing products. Products are considered to be "unlocked" if the product can be added to an existing user's cart for less than a price of the product without respect to the existing cart. That is, the product is less expensive when purchased with the cart than when purchased alone. Thus, an unlocked product can be sold more cheaply (i.e., increased savings) with the prospective product in the cart compared to the savings received when the prospective product is not in the cart. The increased savings of a particular product being added to a cart is the marginal decrease in price when the particular product is sold with the cart instead of the product and the cart being sold separately. These increased savings can be due to advantages of buying multiple products from a single merchant, i.e., savings in shipping cost from shipping multiple units of or more products in the same box. Products also can have various degrees of "savings potential" based on the group of products they would unlock if added to the user's cart. Savings potential can be measured based on the number and breadth of additional products that the product will unlock.

The merchant management system can measure a savings potential for a particular product and assign the particular product a "savings score" that can be displayed to users. Displaying the savings score or an indicator of the savings score of a product can help influence a user's choice of product to encourage the user to choose products that have the most savings potential. The merchant management system can calculate a savings score for a product that could be added to a cart for purchase (a "prospective product") by determining and evaluating products that are "unlocked" by adding the prospective product to the cart. An unlocked product, with respect to a prospective product, is a product that can be sold more cheaply (i.e., increased savings) with the prospective product in the cart compared to the savings received when the prospective product is not in the cart.

Because users are able to increase their potential savings by purchasing products with high savings scores, the merchant management system can influence the purchases of users by displaying the savings score of prospective products in a user interface as users browse the prospective products. This also can help inform users which products unlock more or fewer other products for purchase. In some embodiments, the savings score can be assigned to a display category associated with a specific icon or symbol.

Figure 2:
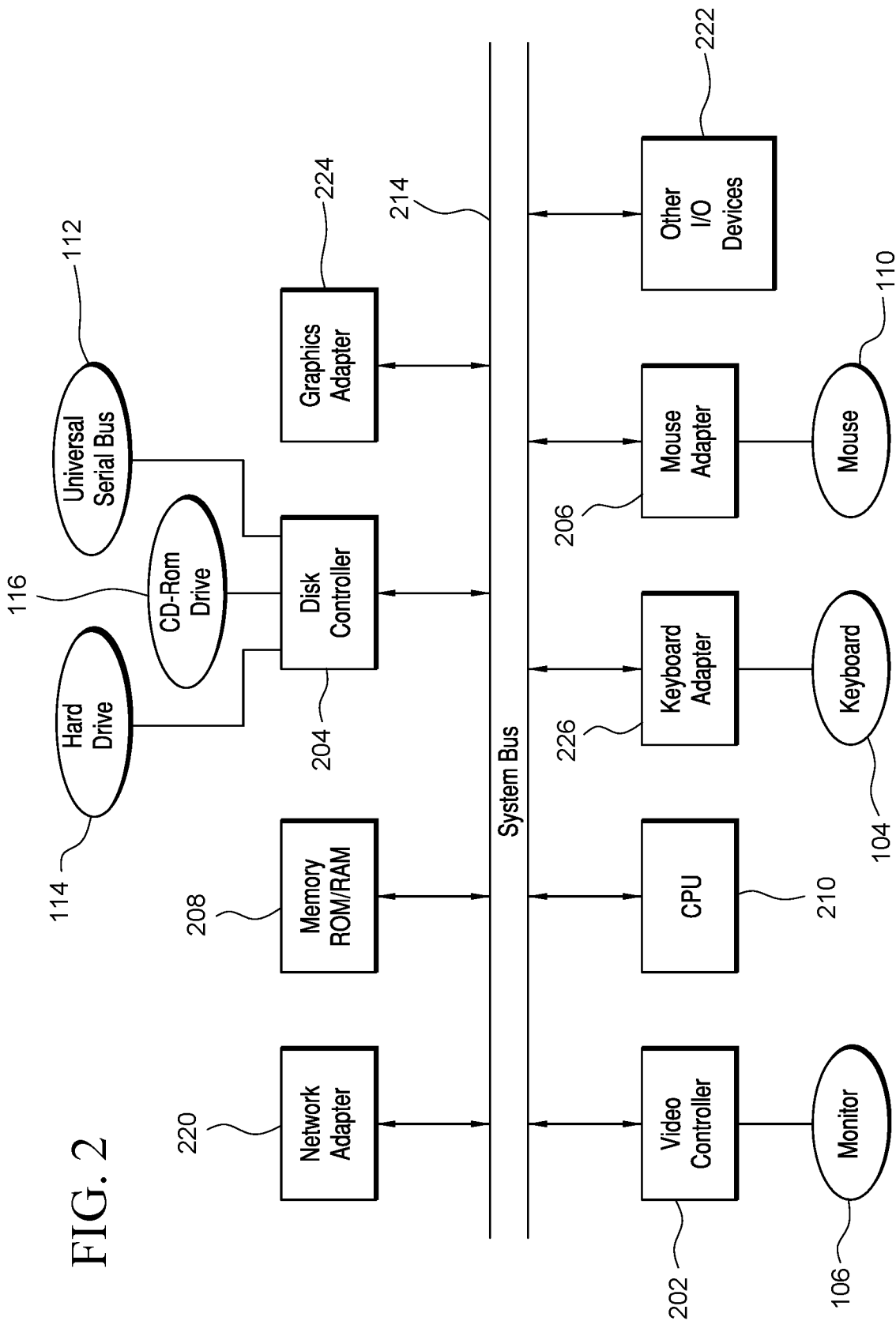
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
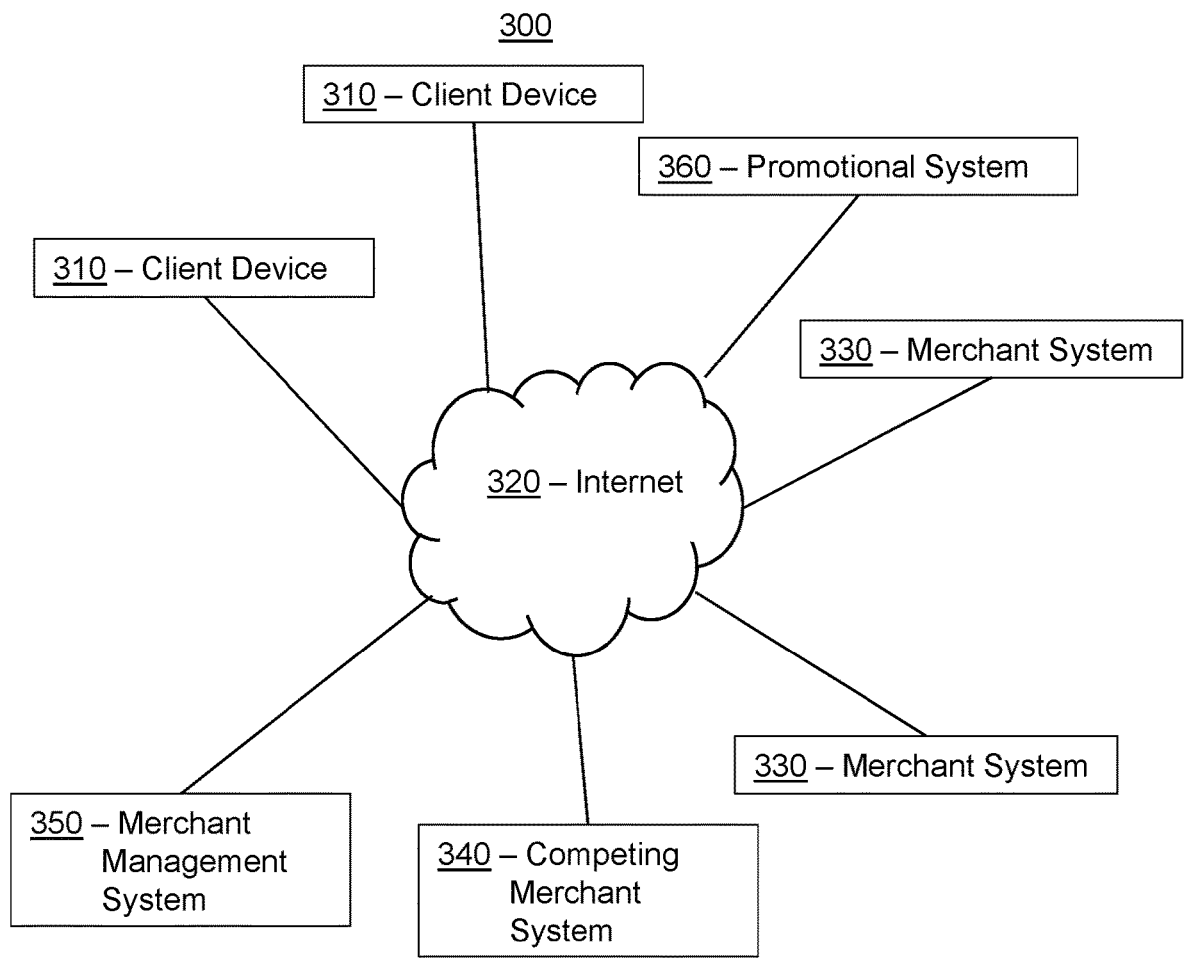
FIG. 3 illustrates a representative block diagram of a system, according to an embodiment.

Turning ahead in the drawings, FIG. 3 illustrates a high level block diagram of a system environment 300 for a merchant management system 350. The system environment 300 shown by FIG. 3 can comprise one or more client devices 310, a network 320, one or more merchant systems 330, one or more competing merchant systems 340, one or more promotional systems 360 and the merchant management system 350. In alternative configurations, different and/or additional components may be included in the system environment 300. The merchant management system 350 provides an interface for users to purchase products offered by one or more merchant systems 330 and determines discounts for the products as further described below.

Merchant management system 350 (shown in greater detail in FIG. 4), merchant system 330, promotional system 360, and/or competing merchant system 340 are merely exemplary and embodiments of system environment 300 and are not limited to the embodiments presented herein. Merchant management system 350, merchant system 330, promotional system 360, and/or competing merchant system 340 can be employed in many different embodiments or examples not specifically depicted or described herein. In some embodiments, certain elements or modules of merchant management system 350, merchant system 330, promotional system 360, and/or competing merchant system 340 can perform various procedures, processes, and/or activities. In these or other embodiments, the procedures, processes, and/or activities can be performed by other suitable elements or modules of merchant management system 350, merchant system 330, promotional system 360, and/or competing merchant system 340.

Generally, therefore, merchant management system 350, merchant system 330, promotional system 360, and/or competing merchant system 340 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of merchant management system 350, merchant system 330, promotional system 360, and/or competing merchant system 340 described herein.

In some embodiments, each of merchant management system 350, merchant system 330, promotional system 360, and/or competing merchant system 340 can include a computer system, such as computer system 100 (FIG. 1), as described above, and can be a single computer, a single server, or a cluster or collection of computers or servers, or a cloud of computers or servers. In another embodiment, a single computer system can host each of or only one or merchant management system 350, merchant system 330, promotional system 360, and/or competing merchant system 340.

In many embodiments, merchant management system 350, merchant system 330, promotional system 360, and/or competing merchant system 340 also can comprise user computers or client devices 310. In some embodiments, client devices 310 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, merchant management system 350, merchant system 330, promotional system 360, and/or competing merchant system 340 can include their own respective web servers. The web server can be in data communication through the Internet or network 320 with client devices (e.g., 310). In certain embodiments, the client devices can be desktop computers, laptop computers, smart phones, tablet devices, and/or other endpoint devices. The web server can host one or more websites. For example, the web server can host an eCommerce website that allows users to browse and/or search for products, to add products to an electronic shopping cart, and/or to purchase products, in addition to other suitable activities.

In many embodiments, merchant management system 350 can comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of merchant management system 350 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of merchant management system 350. In a similar manner, the processing module(s) and the memory storage module(s) can be local and/or remote to each other.

In many embodiments, merchant management system 350 can be configured to communicate with one or more client devices 310. In some embodiments, client devices 310 also can be referred to as customer computers. In some embodiments, merchant management system 350 can communicate or interface (e.g., interact) with one or more customer computers (such as client devices 310) through Internet or a network 320. Network 320 can be an intranet that is not open to the public. Accordingly, in many embodiments, merchant management system 350 (and/or the software used by such systems) can refer to a back end of merchant management system 350 operated by an operator and/or administrator of merchant management system 350, and client devices 310 (and/or the software used by such systems) can refer to a front end of merchant management system 350 used by one or more users, respectively. In some embodiments, users also can be referred to as customers, in which case, client devices 310 can be referred to as customer computers. In these or other embodiments, the operator and/or administrator of merchant management system 350 can manage merchant management system 350, the processing module(s) of merchant management system 350, and/or the memory storage module(s) of merchant management system 350 using the input device(s) and/or display device(s) of merchant management system 350.

Meanwhile, in many embodiments, merchant management system 350 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between merchant management system 350 and/or the one or more databases can be implemented using any suitable manner of wired and/or wireless communication. Accordingly, merchant management system 350 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Client devices 310 can be one or more computing devices capable of receiving user input as well as transmitting and/or receiving data via network 320. In some embodiments, one or more of client devices 310 are conventional computer systems, such as a desktop computer, laptop computer, and/or computer system 100. Alternatively, one or more of client devices 310 may be a device having computer functionality, such as a personal digital assistant (PDA), a mobile telephone, a smartphone or another suitable device. Client devices 310 can be configured to communicate via the network 320. In one embodiment, client devices 310 execute an application allowing users of client devices 310 to interact with merchant management system 350. For example, client devices 310 can execute browser applications to enable interaction between client devices 310 and merchant management system 350 via network 320. In some embodiments, client devices 310 can execute native applications running on client devices 310 that interact with merchant management system 350 through application programming interfaces (APIs) of merchant management system 350.

Network 320 can provide a channel through which the various systems communicate, and can comprise any combination of local area and/or wide area networks, using both wired and/or wireless communication systems.

One or more embodiments of merchant systems 330 can be coupled to network 320 for communicating with merchant management system 350 and client devices 310. Merchant systems 330 sell products to users of client devices 310 through merchant management system 350. These products can be physical goods, digital goods, or services. Merchant systems 330 also can sell products to the users of client devices 310 separately and without interfacing with merchant management system 350.

For physical goods, each merchant associated with merchant system 330 maintains a physical inventory of products that are available to sell and can store those products in one or more warehouses associated with merchant system 330. Merchant system 330 maintains a database of the inventory available at each warehouse for that merchant. The number and locations of the one or more warehouses associated with each merchant system 330 can vary according to each merchant's physical warehouse operations. The merchant may space out warehouses geographically instead of locating multiple warehouses near each other. Typically, merchant system 330 can select warehouse locations based on operational costs and the locations of users who purchase products from merchant system 350. This allows merchant system 330 to minimize shipping distances (and thus shipping costs) by increasing the likelihood of a particular user's shipping location being near one of the warehouses. Additionally, for that reason, a product offered by the merchant may be stocked in several different warehouses. For example, merchant system 330 may have three warehouses: a first located in San Jose, Calif.; a second located in Atlanta, Ga.; and a third located in Milwaukee, Wis. If the only warehouse that stocks coffee is the warehouse in Milwaukee, it will cost more to ship the coffee to a user located in Mountain View, Calif. than if the San Jose warehouse also stocked coffee and could ship the coffee to the user located in Mountain View.

For digital goods and services, merchant systems 330 can maintain a database of its inventories as applicable. For example, if there is no limit on how many units of a particular electronic book (a digital good) merchant system 330 can sell, there is no need to record an inventory value for that product. However, if merchant system 330 only has a set number of digital licenses for the electronic book, it is necessary to store information about the inventory level for that product.

Merchant systems 330 also can provide merchant management system 350 with merchant rules that affect the pricing of their products. These merchant rules can relate to discounts given on the merchant's products based on user shipping locations, the number of units of a product being purchased, return policies, payment methods, and purchase of warranties. Merchant rules and the associated discounts are described further in conjunction with the merchant data store 405 of FIG. 4.

One or more competing merchant systems 340 also can be coupled to network 320. Competing merchant systems 340 can be similar to merchant systems 330 in purpose and operation. However, competing merchant systems 340 do not sell products through merchant management system 350 and, instead, compete with merchant management system 350 for sales to users. Thus, prices offered by competing merchant systems 340 are competition for those offered by merchant systems 330 through merchant management system 350.

One or more promotional systems 360 also can be coupled to network 320. Promotional systems 360 are associated with products but do not necessarily offer products directly to consumers. For example, a promotional system 360 may be a manufacturer or brand of a particular product. Promotional systems 360 also can define merchant-independent merchant rules that affect product prices. For example, a promotional system 360 associated with Brand A can provide a discount of 20% off of Brand A diapers regardless of which merchant system 330 offers the diapers.

Figure 4:
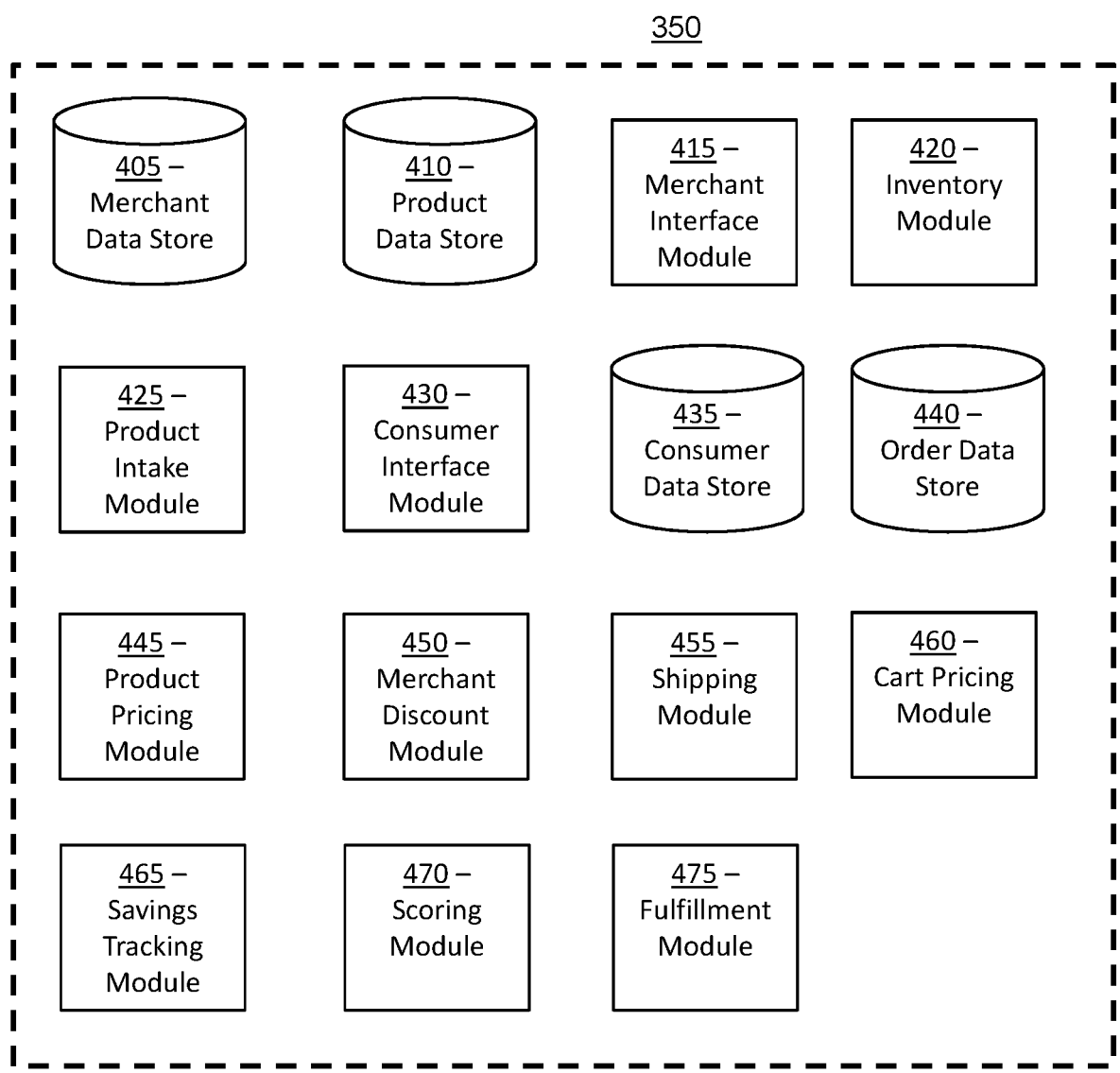
FIG. 4 is a block diagram of an architecture of a portion of the system of FIG. 3, according to one embodiment.

FIG. 4 is a block diagram of system architecture of merchant management system 350, according to one embodiment. In some embodiments, merchant management system 350 operates as a merchant system 330 (FIG. 3) in addition to performing the functionality described below. That is, merchant management system 350 also can maintain a set of products to be fulfilled by merchant management system 350. Additionally, in some embodiments, merchant management system 350 operates as only merchant system 330 (FIG. 3). Merchant management system 350 in FIG. 4 includes a merchant data store 405, a product data store 410, a merchant interface module 415, an inventory module 420, a product intake module 425, a consumer interface module 430, a consumer data store 435, an order data store 440, a product pricing module 445, a merchant discount module 450, a shipping module 455, a cart pricing module 460, a savings tracking module 465, a scoring module 470, and a fulfillment module 475. In other embodiments, merchant management system 350 can include additional, fewer, or different components for various applications. Conventional components such as network interfaces, security functions, load balancers, failover servers, management and network operations consoles, and the like are not shown so as to not obscure the details of the system architecture.

In some embodiments, merchant data store 405, product data store 410, merchant interface module 415, inventory module 420, product intake module 425, consumer interface module 430, consumer data store 435, order data store 440, product pricing module 445, merchant discount module 450, shipping module 455, cart pricing module 460, savings tracking module 465, scoring module 470, and/or fulfillment module 475 can each include a computer system, such as computer system 100 (FIG. 1), as described above, and can be a single computer, a single server, or a cluster or collection of computers or servers, or a cloud of computers or servers. In another embodiment, a single computer system can host each of merchant data store 405, product data store 410, merchant interface module 415, inventory module 420, product intake module 425, consumer interface module 430, consumer data store 435, order data store 440, product pricing module 445, merchant discount module 450, shipping module 455, cart pricing module 460, savings tracking module 465, scoring module 470, and/or fulfillment module 475.

Product data store 410 can store product information for products offered by merchant management system 350. Each product may be offered by one or more of merchant systems 330 (FIG. 3). The product information includes a product identifier that uniquely identifies the product to distinguish a product from other products. One example product identifier is a SKU for each product. For example, long black yoga pants from Brand A has a different product identifier than cropped black yoga pants from Brand A and long black yoga pants from Brand B. The product identifier may be set by merchant management system 350, by industry convention, or by the original manufacturer of a product.

Additional product information may include a descriptive product title, product descriptions, product size and weight, and pricing from competing merchant system 340 (FIG. 3). In some embodiments, only the lowest price offered by competing merchant system 340 is stored. The products in data store 410 can include any individually-purchasable product, such as combinations of other products or products that include multiple of the same products (a "multipack"). Each combination or multipack may thus be associated with its own product identifier and product information. For example, a combination product (including a water bottle and an arm band) may have a distinct product identifier, though each of the individual products also may be offered as a separate product with their own distinct product identifiers.

Merchant data store 405 can maintain information specific to individual merchant systems 330 (FIG. 3). This merchant-specific information includes shipping information, product information, and merchant rules specific to individual merchant systems 330 (FIG. 3).

Shipping information is used to determine shipping costs for products sold by merchant system 330 (FIG. 3). Shipping information can include the number and location of warehouses associated with merchant system 330 (FIG. 3). Merchant management system 350 determines the shipping cost for a particular product based on the warehouse locations. In some embodiments, merchant system 330 (FIG. 3) determines the shipping cost for its products based on its own shipping pricing rules. In this case, the shipping pricing rules set by merchant system 330 (FIG. 3) also are included in the shipping information. The shipping pricing rules can include flat-rate shipping costs based on order price, flat-rate shipping costs based on shipping weight, and formulaic shipping costs based on one or both of shipping distance and shipping weight. For example, merchant system 330 (FIG. 3) can charge $5 for shipping for orders that cost under $25, $10 for orders between $25-$100 and $15 for orders over $100. By way of another example, merchant system (FIG. 3) 330 can charge $0.10 per mile of shipping distance and $2 per pound of shipping weight. In other embodiments, merchant system 330 (FIG. 3) can integrate shipping costs into merchant product prices and does not have any further shipping pricing rules.

Product information stored at merchant data store 405 can be related to the products that are offered for sale by the merchants, including each merchant's inventory and pricing for products offered by the merchant. Thus, merchant data store 405 can identify which products are offered by individual merchants and can provide further information for that merchant's sale of those products. The inventory of merchant system 330 (FIG. 3) can identify which products are sold by a merchant and can include an identifier and number of units for each product that merchant system 330 (FIG. 3) has available for sale. When merchant system 330 (FIG. 3) identifies a product by another product identifier than the identifier used by merchant management system 350, the product information also can include a mapping between product identifiers that identify products at merchant management system 350 and an identifier for the product at merchant system 330 (FIG. 3). In some embodiments, the product information also specifies shipping weight and shipping dimensions for a merchant that varies from the shipping weight and dimension stored at product data store 410. In some embodiments, inventories can be warehouse-specific and stored in conjunction with the warehouses in addition to merchant system 330 (FIG. 3). In some embodiments, rather than storing inventory and pricing for individual merchants at merchant management system 350, merchant management system 350 can retrieve inventory and pricing from merchant system 330 (FIG. 3) when necessary.

In many embodiments, merchants can elect to set merchant-specific merchant rules that are used by merchant management system 350 to determine discounts included in a user's customer price. In the absence of merchant rules set by the merchant, merchant management system 350 can apply a set of default merchant rules or merchant rules that supersede merchant rules provided by a merchant. Thus, in one embodiment, the merchant rules are set by merchant management system 350 instead of merchant systems 330 (FIG. 3). In another embodiment, some merchant rules are applied by the merchant management system 350 across all merchant systems 330 (FIG. 3). In yet another embodiment, some merchant rules are set by the promotional systems 360 and are applied by the merchant system 350 across all merchant systems 330 (FIG. 3). Various types of merchant rules are described below, and include a bulk discount, a returnability discount, a payment method discount, a shipping discount, a warranty discount, and a brand discount.

A "bulk discount" merchant rule can apply to users that purchase more than one unit of a particular product in a single order. Bulk discounts can be offered as a percentage of the merchant product price or as a set discount amount per unit. A bulk discount can be triggered by certain numbers of units and remain constant within those ranges. For example, buying 1-5 units may not result in a bulk discount, while buying 6-25 units results in a 5% discount and buying 25+ units results in a 8% discount. Alternatively, the bulk discount can be proportional to the number of units purchased, up to a cap percentage or amount. For example, each unit after the first unit purchased may result in an additional 0.25% discount, up to 30%, such that two units receives a 0.25% discount, while three units receives a 0.50% discount, 16 units receives a 4% discount, and 121+ units receives a 30% discount.

A "returnability discount" merchant rule can apply to users that waive the right to return a product. Returnability discounts can be offered as a percentage of the merchant product price, or as a set amount. A returnability discount can require that the user cannot return the product at all, or that the user would have been able to return the product for free but would now need to pay a fee if they later decide that they would like to return the product. For example, merchant system 330 can offer a user 10% off of the merchant product price if they choose waive the right to return a product that would have been free to return, but require that the user pay a $10 fee if they do decide to return the product. If the merchant product price is $50, the user would be able to buy the product for $45, but would only receive $35 if they returned it.

A "payment method discount" merchant rule can apply to users that have selected particular payment methods. Payment method discounts are generally offered as percentages of the merchant product price based on fees that are charged to merchant systems 330 (FIG. 3) by entities associated with particular payment methods. For example, a first credit card issuer can impose a 3% fee on merchants, and a second credit card issuer can impose a 2% fee on merchants, while direct transfers from bank accounts and payments via electronic checks are not associated with any fees for the merchant. Merchant system 330 (FIG. 3) can thus set their merchant product price assuming that they will need to cover the first credit card issuer's 3% fee and then be able to give the user a discount of 1% if the user pays with credit card from the second credit card issuer, or a discount of 3% if the user pays with an electronic check.

A "shipping discount" merchant rule can apply to users with shipping locations within certain distances of a merchant's warehouse. Shipping discounts can be offered as a percentage of the merchant product price, or as a set amount. For example, users with shipping locations within 50 miles of a warehouse associated with merchant system 330 (FIG. 3) can be offered a shipping discount of 5% of the merchant product price. Shipping discounts also can be offered as a difference between the shipping cost included in the merchant product price and the actual shipping cost that is calculated by merchant management system 350. In one embodiment, shipping discounts are only offered by merchant systems 330 (FIG. 3) that have shipping costs included in their merchant product prices.

Additionally, a warranty may be offered for a product. A merchant may offer a "warranty discount" for a product based on profits for warranties sold on the product. The profits may be expected profits or may be historic profits based on projected revenue and warranty redemption. Some or all of this profit may be provided by merchant management system 350 as a warranty discount on the product. For example, if a warranty for a product costs 5% of the merchant product price and 50% of the price of the warranty is profit, a user can be offered a discount of 2.5% of the merchant product price when purchasing the warranty with the product.

A "brand discount" can be offered for a particular brand of product. Brand discounts can be offered as a percentage of the merchant product price, or as a set amount. Brand discounts determined by promotional system 360 can apply to a particular merchant system 330 (FIG. 3), a set of merchant systems 330 (FIG. 3) (e.g., authorized sellers) or all merchant systems 330 (FIG. 3). Brand discounts may depend on the brand of the other products in a cart. For example, Brand A may offer a brand discount if a product from Brand B is in a cart. For example, Brand A may offer a brand discount of 20% for its paper towels if Brand B paper towels are in a cart. In some embodiments, a brand discount is offered based on the manufacturer of the product.

Merchant interface module 415 can interface with merchants and merchant systems 330 (FIG. 3) to receive and update merchant-related information. Certain merchant information can be manually entered by a merchant, while other information can be automatically retrieved from the merchant systems 330 (FIG. 3). Merchant interface module 415 can generate a user interface that is displayed to an operator of merchant system 330 (FIG. 3) that interacts with the user interface to manually input information. The information received by merchant interface module 415 can include merchant rules, as well as inventory and pricing information. As noted below, the inventory and pricing also can be automatically retrieved by inventory module 420.

Inventory module 420 can retrieve product information, pricing, and inventory from merchant systems 330 (FIG. 3) and can store such inventories to merchant data store 405. Inventory module 420 can thus provide an interface to retrieve information from merchant systems 330 (FIG. 3) and update information about products offered by a merchant. Inventory module 420 may retrieve inventory information at specified times, such as once a day, or may query merchant systems 330 (FIG. 3) for inventory information when a request is made to purchase or fulfill a particular product to determine real-time product availability by the various merchants. For each product, the quantity of that product for each merchant can be retrieved from merchant data store 405 to accurately reflect the products and related quantities that merchant management system 350 can offer to users.

Product intake module 425 can add new products to product data store 410. If, when retrieving a merchant's inventory, inventory module 420 receives an identifier from the merchant for a product that it cannot identify in product data store 410, the product information is sent to product intake module 425. Product intake module 425 can create a product identifier for the product, and also can store the product information in product data store 410. In some embodiments, product intake module 425 can use an identifier received from a merchant as a product identifier, such as a merchant's identifier or a manufacturer identifier, and does not create a separate product identifier for the product.

Consumer interface module 430 can provide a user interface for users to interact with merchant management system 350. The user interface generated by consumer interface module 430 can allow the users to navigate products offered on merchant management system 350. Additionally, the user interface can allow users to select products to purchase and place orders for those products. The user interface generated by consumer interface module 430 is described further in conjunction with FIGS. 7 and 8.

Consumer data store 435 can store user information collected by consumer interface module 430. User information can include various information relating to purchasing products though merchant management system 350, such as purchase history information describing the user's past purchases. User information also can include a default shipping location and default payment information. User information can be collected by consumer interface module 430 through user prompts, or inferred by merchant management system 350 based on the user's purchase history information. In one embodiment, the default shipping location and default payment information are the shipping location and payment information used for the user's most recent purchase. The user information can be stored in a user profile that is unique to each user.

Order data store 440 can store information related to in-progress and completed orders. Each order has an order identifier and includes a user purchasing the order, the products and related quantities in the order, and pricing information. The user information can include a user identifier. The pricing information can include the customer prices and fulfilling merchant system 330 (FIG. 3) for each product in the order, as well as the discounts applied to the user's order.

Product pricing module 445 can determine customer prices for individual products offered to users of merchant management system 350. Because products can be offered by several eligible merchants and various discounts may be available, product pricing module 445 can determine which price to present to a given user as their customer price for that product. The customer price for a product is based on merchant offer prices offered by merchant systems 330 (FIG. 3) and any applicable merchant rule discounts. The customer price for a product can be determined without respect to other products that may be purchased by the user. That is, as if the user is purchasing the product individually. As described below in conjunction with cart pricing module 460, as a user adds additional products to an order, various discounts may apply that permit the product to be fulfilled by another merchant system 330 (FIG. 3) than the one on which the customer price is based.

When a user accesses a product or otherwise views a product, the customer price can be calculated for a user based on user-independent merchant product prices of merchant systems 330 (FIG. 3) that offer the product. Initially, merchant offer prices are determined for each merchant system 330 that offers the product. Merchant offer prices are the merchant product prices offered by merchant systems 330 (FIG. 3) adjusted by discounts determined by merchant discount module 450 and shipping costs or discounts determined by shipping module 455. In one embodiment, merchant systems 330 (FIG. 3) provide their cost data to merchant management system 350 such that merchant management system 350 does not need to interface with merchant systems 330 (FIG. 3) to determine merchant offers. In another embodiment, merchant offer prices are calculated by merchant systems 330 (FIG. 3), and merchant management system 350 determines merchant offer prices by retrieving them from the merchant systems 330 (FIG. 3). In this embodiment, merchant systems 330 (FIG. 3) can calculate the merchant offer prices for each product based on information about the cart that is sent to merchant systems 330 (FIG. 3) by merchant management system 350.

The lowest merchant offer price can be selected as the customer price that is presented to the user. Prices offered by competing merchant systems 340 can also be taken into consideration. In one embodiment, the customer price is never higher than the lowest competitor price. In this embodiment, when the lowest merchant offer price is higher than the lowest competitor price, merchant management system 350 sets the customer price to be equal to the lowest competitor price. However, in other embodiments, merchant management system 350 may set the customer price higher than the lowest merchant offer price or the lowest competitor price.

In some embodiments, when evaluating a merchant offer price for a product, a user can be queried to determine a shipping location, warranty options, and so forth applicable to the product. Product pricing module 445 can query merchant discount module 450 to determine discounts for a product applicable to the user and the user's selected product with respect to the eligible merchants.

Merchant discount module 450 can calculate discounts that are specific to particular merchants. These discounts are based on merchant rules stored in merchant data store 405. The calculated discounts are provided to product pricing module 445 for inclusion in the customer price. For example, the merchant rules may provide a discount as indicated above based on selection of a warrantee, waiver of returnability, and so forth, as set out by a the applicable merchant rules for a merchant.

Shipping module 455 can calculate shipping costs for one or more products that are to be fulfilled by a particular merchant system 330 (FIG. 3). Shipping module 455 can provide shipping costs for individual products, or can incorporate multiple products into a single shipment, for example to provide a cart-based "box discount" as further described below. Thus, shipping module 455 can receive a set of products, a merchant and a shipping destination to determine the shipping cost for sending the set of products to the shipping destination from the merchant. Shipping costs may depend on shipping-related information, such as shipping distance, shipping dimensions, and shipping weight. Shipping distance can be determined by determining a warehouse from which the designated merchant may provide the set of products, and the distance to the specified shipping destination. In some embodiments, the merchant system 330 (FIG. 3) that is to fulfill the one or more products has multiple warehouses that can fulfill the products. In this case, the warehouse that minimizes the merchant shipping cost when shipping the product to the shipping location is selected. For example, the warehouse that is closest to the user shipping location may result in the lowest merchant shipping cost and thus would be chosen over warehouses that are further away from the user shipping location.

Shipping module 455 also can determine costs associated with multiple shipping configurations for a single product. In particular, a product's shipping speed can be different for different merchant systems 330 (FIG. 3) even if they are using the same delivery method (i.e., ground, expedited, two-day, next-day, etc.). For example, a product shipped from a warehouse that is closer to the delivery location may arrive at the delivery location earlier than a product shipped from a warehouse that is further from the delivery location regardless of delivery method. In such a situation, merchant management system 350 can choose the warehouse located further away despite the slower shipping speed if the price offered by the associated merchant system 330 (FIG. 3) is lower than that offered by a merchant system 330 (FIG. 3) with the closer warehouse. Merchant management system 350 can then offer the user an option to choose a slightly higher price in order to ship the product from the closer warehouse so that it arrives earlier. Alternatively or additionally, merchant management system 350 can opt to delay shipping a product in order to aggregate volume in a geographic area so that a larger number of shipments with delivery locations within the same geographic area are given to a delivery company at the same time. This configuration results in reduced shipping costs because of the delivery company's increased delivery density.

In some embodiments, the merchant product price provided by merchant system 330 (FIG. 3) includes shipping costs. In this case, it may calculate a shipping discount based on merchant rules or a difference between the shipping cost that is included in the merchant product price and a shipping cost calculated by the shipping module.

Cart pricing module 460 can determine a "cart discount" for a product based on one or more other products in a cart. A cart is a prospective order of products prior to confirmation and payment by a user to finalize the order. As a user browses products at merchant management system 350, the user may add products to the cart. The cart can comprise an electronic cart on a website of an online retailer or an eCommerce website. As the user adds a product to the cart, the cart discount is calculated and applied to the price of products in the cart to reduce the price of the total purchase (i.e., the cart). In addition to calculating the cart discount for an existing cart, the cart discount also can be determined for individual products that are not yet part of the cart and calculated based on that product prospectively added to the cart. Thus, if a current cart includes five products, a cart discount may be calculated with respect to the five products in the current cart. In addition, as a user browses products at merchant management system 350, when an additional product is shown to a user, the additional product can be added to the existing five-product cart to determine a cart discount if the user adds the additional product to the existing cart. Thus, the five-product cart is evaluated with the additional product to determine a cart discount, as though all six products had been added to the cart. The cart discount accounting for the additional product, showing a discount relative to the five-product cart, may be shown with the additional product to reflect an the additional discounts available when the additional product is added to the cart.

The cart discount accounts for a reduction in price that may accrue from several products sold together in an order. Many times, when a merchant sells multiple products together instead of individually, the merchant is able to save on various costs, such as shipping. For example, shipping multiple units of one or more products in a single box is cheaper than shipping the multiple the units or products in their own individual boxes because the cost of shipping generally involves a base rate per package plus a rate based on weight. Thus, cart discounts reflect efficiencies generated by purchasing multiple products from a single merchant.

In addition to products that directly result in increased savings, i.e. cart discounts, when sold with a particular cart, there are products that increase the potential savings available to the user when the product sold with a particular cart. These potential savings that may be gained by adding a prospective product to a cart are the prospective product's "savings potential," which is quantified by a "savings score." Savings tracking module 465 and scoring module 470 can work together to determine and convey the savings potential of prospective products based on the additional products the prospective products "unlock." Savings tracking module 465 can determine a group of products that would be unlocked by adding a prospective product to a cart, and scoring module 470 can evaluate the unlocked group of products to assign the prospective product a savings score reflective of its saving potential that can be displayed to the user.

In many embodiments, savings tracking module 465 can determine which products are unlocked by adding a prospective product to a user's cart. That is, savings tracking module 465 can identify the extent to which adding a prospective product to a user's cart may increase the number of available products that may receive a discount or otherwise produce additional savings if sold with the prospective product. Each additional product that may be sold with the prospective product in the cart (relative to the existing cart) thus would be "unlocked" if the prospective product were added to the cart. The additional products that are "unlocked" by the prospective product in some embodiments do not affect the price or savings associated with the prospective product itself. That is, unlocking additional products does not lower the price of the prospective product itself, but rather reflects additional items that could subsequently be added for a higher discount relative to the existing cart. Thus, unlocking additional products results in increased savings potentials reflecting possible savings for additional products.

To determine which products are unlocked by the prospective product, savings tracking module 465 can determine which products can be sold with a prospective product. In some embodiments, all other products that are offered by the same merchant that offers the prospective product are products that can be sold with the prospective product. In other embodiments, savings tracking module 465 includes only those products that can be shipped with the prospective product.

In many embodiments, savings tracking module 465 also can compare groups of products to determine which products are in one group but not the other. The comparison of two groups of products can be used to determine which products will be unlocked by adding a prospective product. In particular, products offered by a first merchant group can be compared to products offered by a second merchant group to identify products that are offered by the second merchant group, but not the first merchant group In many embodiments, scoring module 470 can determine a savings score for a group of products that is unlocked by a particular prospective product. This group of products can be scored based on the quantity, breadth, and quality of its component products. For example, larger quantity, greater breadth, and higher quality may all correspond to a higher savings score. A group of products may be considered to be of greater breadth as the different categories over which the group of products is distributed increases. For example, a group of products that includes products classified as "home goods," "food," "clothing," and "sporting goods" would have greater breadth than a group of products that only includes products classified as "jewelry." A group of products may be considered to be of higher quality if the group of products includes more popular or high-selling products, fast-shipping products, better-reviewed products, or products that a specific user might be more interested in buying. These products of interest to the user can be products or categories of products in which the user has previously purchased or otherwise expressed interest, or products or categories of products that are similar to those products or categories in which the user has previously purchased or expressed interest.

Once an order is placed by a user, fulfillment module 475 sends orders to merchant systems 330 (FIG. 3) for fulfillment. The orders that are placed by users can involve products that are provided by several different merchant systems 330 (FIG. 3). Fulfillment module 475 can split up user orders up according to merchant systems 330 (FIG. 3) providing the products. For example, if a user has placed an order with three products provided by two merchant systems 330 (FIG. 3), the user order can be split into two sub-orders, which are sent to separate ones of merchant systems 330 (FIG. 3) fulfilling the particular sub-order.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, merchant management system 350 (FIGS. 3 and 4) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules (i.e., 415, 420, 425, 430, 445, 450, 455, 460, 465, 470, and/or 475 in FIG. 4). Such non-transitory memory storage modules can be part of a computer system such as merchant management system 350 (FIGS. 3 & 4). The processing module(s) can be similar or identical to the processing module(s) described above with respect to computer system 100 (FIG. 1).

Method 500 may be performed, for example, by scoring module 470 (FIG. 4) in conjunction with savings tracking module 465 (FIG. 4). In some embodiments, method 500 can optionally comprise an activity 505 of identifying products in an electronic cart of a user on a website of an online retailer. In some embodiments, the online retailer can comprise an exclusively online retailer. In other embodiments, the online retailer is associated or otherwise affiliated with a brick and mortar retailer. In some embodiments, method 500 can optionally comprise an activity 510 of identifying a current cart merchant group for the electronic cart of the user. The current cart merchant group can comprise one or more current merchants that offer the one or more products in the electronic cart of the user. In some embodiments, each merchant can offer all of the products in the electronic cart, or only a portion of the one or more products in the electronic cart. The products that are already in the electronic cart of a user can be used when determining how many products will be unlocked by adding a prospective product to the cart. That is, the number of products unlocked by the prospective product can be relative to or based upon products in an existing cart for the user and the products previously unlocked by the products already in the existing cart for the user.

In some embodiments, savings tracking module 465 (FIG. 4) can identify the merchants that offer the products in the cart to determine which products have already been unlocked. Savings tracking module 465 (FIG. 4) can then determine the products offered by the current cart merchant group that would result in increased savings if sold with the products already in the cart. The products offered by the current merchant group that would result in increased savings if sold with the products already in the cart form a currently-unlocked product group.

Then, method 500 can comprise an activity 515 of identifying a currently-unlocked product group. The currently-unlocked product group can comprise a plurality of current products offered by the current cart merchant group.

Continuing in FIG. 5, method 500 can comprise an activity 520 of determining one or more prospective products for a user to add to the electronic cart. In some embodiments, the one or more prospective products for the user to add to the cart can be determined by savings tracking module 465 (FIG. 4). Activity 520 can comprise determining the one or more prospective products for the user to add to the electronic cart based on an indication of an action by the user on the website of the online retailer. The indication of an action by the user can be determined by consumer interface module 430 (FIG. 4). For example, the user may have viewed the prospective product or added the prospective product to the electronic cart. In other embodiments, activity 520 can comprise determining the one or more prospective products for the user to add to the electronic cart independent of input from the user. For example, each product that is coordinated for display to a user can be considered a prospective product, so that a score can be displayed with the product. The prospective products coordinated for display to the user can be generated randomly or be based on advertisements paid for by a manufacturer or retailer, and/or a user browsing history, a user purchase history, and/or personal information for the user, among other things.

To determine which products are unlocked by a prospective product, in some embodiments savings tracking module 465 (FIG. 4) can identify the merchants that offer the prospective product. Together, these prospective merchants that offer the prospective product form a prospective product merchant group.

Continuing with FIG. 5, method 500 can comprise an activity 525 of identifying a prospective cart merchant group. The prospective cart merchant group can comprise one or more prospective merchants that offer the prospective product. In some embodiments, activity 525 can comprise communicating between merchant management system 350 (FIG. 3) and one or more merchant systems 330 (FIG. 3) to identify the one or more prospective merchants.

Once the prospective merchant group has been identified, savings tracking module 465 (FIG. 4) can then determine the products offered by the prospective product merchant group that also can be sold with the prospective product. These products offered by the prospective product merchant group that also can be sold with the prospective product form a prospectively-unlocked product group.

Next, method 500 can comprise an activity 530 of determining a prospectively-unlocked product group. As described above, the prospectively-unlocked product group can comprise a plurality of products offered by the one or more prospective merchants that are discounted if the prospective product is added to the electronic cart. For example, the plurality of products is considered to be unlocked if the plurality of products can be added to the existing cart of a user for less than a price of the product without respect to the existing cart. That is, the unlocked product is less expensive when purchased with the cart than when purchased alone. Thus, an unlocked product can be sold more cheaply (i.e., increased savings) with the prospective product in the cart compared to the savings received when the prospective product is not in the cart or is in a separate cart by itself. In some embodiments, activity 530 can comprise communicating between merchant management system 350 (FIG. 3) and one or more merchant systems 330 (FIG. 3) to identify the plurality of products offered by the one or more prospective merchants that are discounted if the prospective product is added to the electronic cart.

In some embodiments, activity 530 and other activities in method 500 can comprise using a distributed network comprising distributed memory architecture to determine a prospectively-unlocked product group. This distributed architecture can reduce the impact on the network and system resources to reduce congestion in bottlenecks while still allowing data to be accessible from a central location. In some embodiments determining a prospectively-unlocked product group is performed while a user is shopping on a website of the online retailer, e.g., when a user enters a search query, browses categories of products, adds a product to the electronic cart, and/or sorts products.

In some embodiments, method 500 can comprise an activity of filtering merchants of the prospective cart merchant group. For example, this filtering can use criteria that are applied to the merchants before the merchants are identified or selected for the prospective cart merchant group. When the criteria are applied to filter one or more merchants, not all merchants that offer the particular product(s) are included in the merchant groups. One non-limiting example of a merchant filter can comprise selecting for inclusion in the prospectively-unlocked product merchant group only the merchants that offer at least a threshold number of products other than the prospective product.

In some embodiments, savings tracking module 465 (FIG. 4) can compare the currently-unlocked product group and the prospectively-unlocked product group to determine a subset or modified group of the prospectively-unlocked product group that is not part of the currently-unlocked product group. This subset of the prospectively-unlocked product group is made up of the additional products not previously unlocked by the current cart merchant that would be unlocked by adding the prospective product to the cart.

Figure 6:
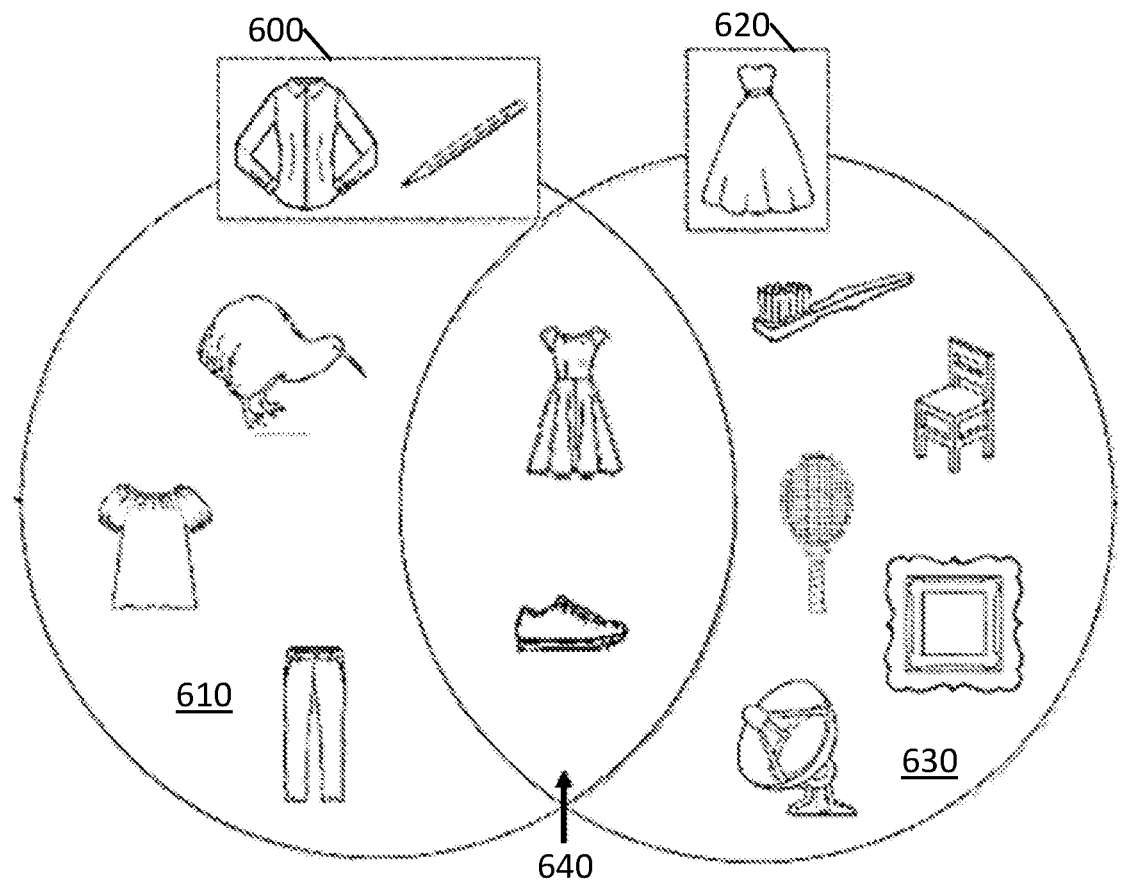
FIG. 6 is a Venn diagram of products offered by two groups of merchants, according to one embodiment.

Then, method 500 can optionally comprise an activity 535 of comparing the prospectively-unlocked product group to the currently-unlocked product group to determine a modified unlocked product group. This modified unlocked product group (or additionally-unlocked product group) can comprise at least one product of the plurality of products that is in the prospectively-unlocked product group but not in the currently-unlocked product group. FIG. 6, described in greater detail below, provides a non-limiting example comparing the prospectively-unlocked product group to the currently-unlocked product group.

In some embodiments, method 500 can optionally continue with an activity 540 of determining a savings score of at least a portion of the prospectively-unlocked product group. For example, in some embodiments, the modified unlocked product group described above can be scored by scoring module 470 (FIG. 4) to determine a savings score associated with the prospective product. The savings score can be based on the modified unlocked product group. The savings score of the modified unlocked product group is discussed above in conjunction with scoring module 470 (FIG. 4). In other embodiments, the entire prospectively-unlocked product group is scored instead of only the modified unlocked product group because products that are in the prospectively-unlocked product group but not the modified unlocked product group may have an increase in savings if purchased with the prospective product in addition to the products in the existing cart. In some embodiments, activity 540 can comprise communicating between merchant management system 350 (FIG. 3) and one or more merchant systems 330 (FIG. 3) to identify the savings score.

Next, method 400 can further comprise an activity 545 of coordinating displaying to the user on the website of the online retailer (1) the prospective product and (2) the savings score of the at least the portion of the prospectively-unlocked product group. In some embodiments, consumer interface module 430 (FIG. 4) can perform activity 545. In embodiments where the savings score is determined for the modified unlocked product group, activity 545 can comprise coordinating displaying to the user on the website of the online retailer (1) the prospective product, and (2) the savings score of the modified unlocked product group. In embodiments where the savings score is determined for the entire prospectively-unlocked product group, activity 545 can comprise coordinating displaying to the user on the website of the online retailer (1) the prospective product, and (2) the savings score of the prospectively-unlocked product group.

Activities 520, 525, 530, 535, and/or 540 can be repeated for each prospective product of a plurality of prospective product that is to be displayed to the user. Accordingly, each prospective product can be displayed with an indication of a savings score for each respective product. In some embodiments, the savings score can be assigned into a display category to more easily and visually indicate the level of savings potential that the prospective product has. For example, the savings score may be assigned to a binary display category with a first display category for scores higher than a threshold score and at least a second display category for scores lower than the threshold score. In another example, there may be multiple display categories that correspond to separate ranges of savings scores. The savings score and/or the savings category can be displayed with the prospective product. The savings score can be displayed as a number, as an icon, and/or as a symbol. In some embodiments, the lowest range of savings scores is represented by a lack of an icon or symbol, as described in greater detail in relation to FIG. 7.

When two savings scores for two prospective products are different, activity 545 can comprise coordinating displaying to the user on the website of the online retailer: (1) a first prospective product of the plurality of prospective products, (2) a first savings score indicator representing a first savings score for the first prospective product; (3) a second prospective product of the plurality of prospective products; and (4) a second savings score indicator different from the first savings score indicator and representing a second savings score for the second prospective product. In some embodiments, information for a savings score can be display when an input device is positioned over a savings score indicator.

Then, method 500 can comprise activities of coordinating displaying first information of the first savings score when the user positions an input device over the first savings score indicator and also coordinating displaying second information of the second savings score when the user positions the input device over the second savings score indicator.

FIG. 6 is a Venn diagram of an example of products offered by two groups of merchants, according to one embodiment. Products 600 are the products that are already in the cart. Currently-unlocked product group 610 contains products that are offered by the current cart merchant group, which is made up of merchants that have been determined to offer products 600 in the cart. That is, the products in the currently-unlocked product group 610 are determined during activity 515 (FIG. 5) of method 500 (FIG. 5), and correspond to products on which savings are already available with respect to products 600.

Product 620 is the prospective product from activity 520 (FIG. 5) of method 500 (FIG. 5). The products contained in prospectively-unlocked product group 630 are those that offered by the prospective product merchant group, including merchants that have been determined during activity 525 (FIG. 5) of method 500 (FIG. 5) to offer prospective product 620. That is, the products in the prospectively-unlocked product group 630 are determined during step 530 (FIG. 5) of method 500 (FIG. 5).

Intersection 640 of currently-unlocked product group 610 and prospectively-unlocked product group 630 encompasses products that are offered by both merchant groups and thus would not be additional products that are unlocked by adding prospective product 620 to the cart. The modified unlocked product group is then determined in activity 535 (FIG. 5) of method 500 (FIG. 5) to be the products in prospectively-unlocked product group 630 that are not also in currently-unlocked product group 610.

In addition to the savings described above, merchant management system 350 (FIGS. 3 & 4) can set savings to influence user purchasing decisions. Increased savings can be offered for products or purchasing habits that are more profitable for merchant management system 350 (FIGS. 3 & 4). For example, specific products can have a higher profit margin for merchant management system 350 (FIGS. 3 & 4), or a particular type or number of products purchased may be linked to higher repeat purchase rates for first-time customers. In these cases, merchant management system 350 (FIGS. 3 & 4) can provide additional savings for these products and override the savings determined by merchant offer prices. Savings also can be influenced by other factors, such as the day of the week, time of the day, the seasons/holidays of the year, and shipment backlog from fulfillment centers (i.e., warehouses), among other factors.

Figure 7:
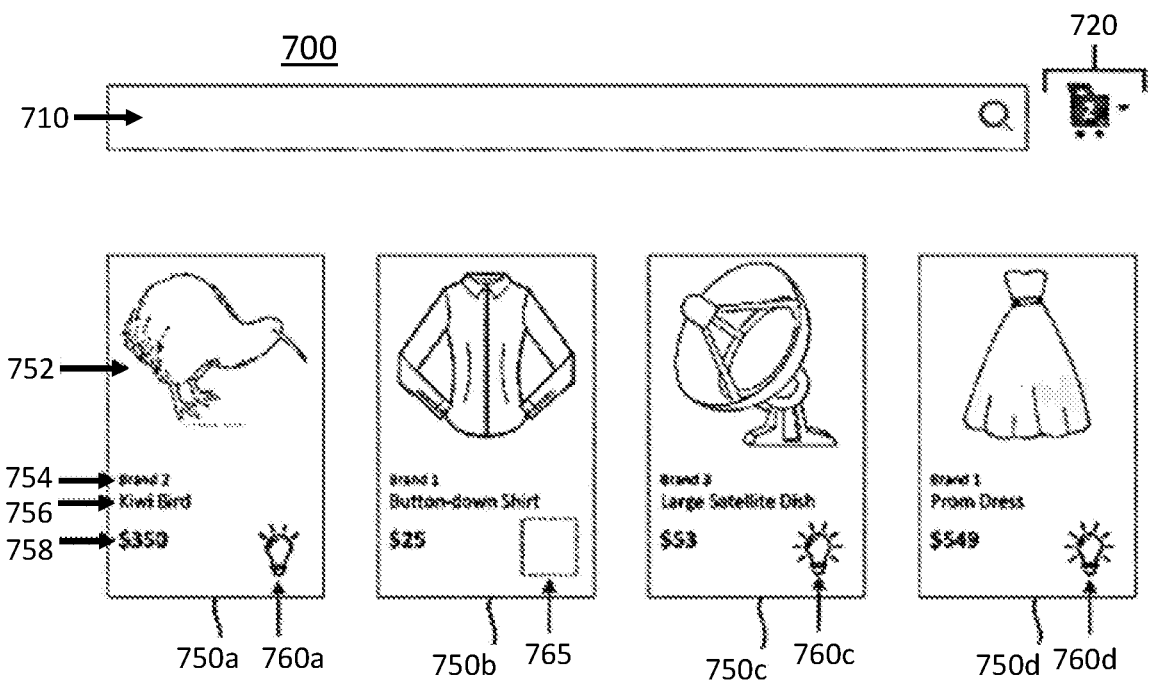
FIG. 7 is a user interface illustrating savings score indicators for prospective products, according to one embodiment.

FIG. 7 is a non-limiting example of a user interface 700 displaying saving score indicators 760 (i.e., 760a, 760c, and 760d) for prospective products, according to one embodiment. User interface 700 can include a search bar 710 and a cart tracker 720 that indicates how many total units of products are in the user's checkout cart. User interface 700 also can include product previews 750 (i.e., 750a, 750b, 750c, and 750d). Each product preview 750 can include descriptive information about the prospective product, such as a product image 752, a brand 754 associated with the product, a product name 756, and a price 758. Each product preview 750 also can include a savings score indicator 760 that visually conveys the savings score of the product.

In some embodiments, user interface 700 can include a plurality of different display categories for the savings score. For example, in the non-limiting embodiment shown in FIG. 7, user interface 700 comprises three different display categories for the savings score: low, medium and high. Each display category for the savings score corresponds to a different savings indicator 760 (or lack thereof). A savings score in the low display category is indicated by no savings indicator, as shown by space 765 in product preview 750b. A savings score in the medium display category is indicated by a "dim" light bulb, such as savings indicator 760a. A savings score in the high display category is indicated by a "bright" light bulb, such as savings indicators 760c and 760d. Accordingly, user interface 700 would convey to the user that the shirt in product preview 750b has a low savings score, the kiwi bird in product preview 750a has a medium savings score, and the large satellite dish of product preview 750c and the prom dress of product preview 750d have high savings scores. In some embodiments, the user can mouse-over savings indicators 760 to view details that were factored into computing the savings score for the prospective product. For example, the mouse-over display can include the number of unlocked products, a number of categories that the unlocked products are in, and a sample of the unlocked products (i.e., product previews of a few unlocked products).

In some embodiments, there can be fewer or more display categories than those described above. Accordingly, there would be fewer or more distinct saving indicators 760 based on the number of display categories. Additionally in some embodiments, savings scores are assigned to display categories (and thus savings indicators 760) relative to the savings scores of other products displayed on the same page of user interface 700. The savings indicators 760 also can be different symbols, or even numerical representations of the savings scores.

Figure 8:
FIG. 8 is a user interface illustrating a notification of products unlocked when a user adds a prospective product to the cart, according to one embodiment.

FIG. 8 illustrates a non-limiting example of a user interface 800 illustrating a notification 820 of products unlocked when a user adds a prospective product to the cart, according to one embodiment. User interface 800 can be shown in response to the user adding prospective products to the cart and indicates how many products (or units of a particular product or total units of products) have been added to the cart with indicator 810, as well as a notification 820 of how many products were unlocked by adding the particular products to the cart. User interface 800 also can include other miscellaneous links, like a link 830 to continue shopping and a link 840 to view the existing cart. User interface 800 also can include information about the unlocked products in some embodiments. For example, the information about the unlocked products can include product previews of, images of, and descriptive information about a few of the unlocked products, as well as one or more categories of the unlocked products.

As noted above, system 300 (FIG. 3) can include one or more client devices 310 (FIG. 3). Method 500 (FIG. 5) also can include one or more activities performed by client device 310 (FIG. 3). For example, method 500 (FIG. 5) can comprise activities of receiving a selection by the user of the one or more products for placement in the electronic shopping cart, transmitting from client device 310 (FIG. 3) to merchant management system 350 (FIG. 3) the selection of the one or more products for placement in the electronic shopping cart, and/or displaying the prospective product and the savings score for the prospective product.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. The terms "savings" and "price" are used throughout the specification to refer to lower costs that are passed onto users. Thus, "higher savings" and "lower prices" can refer to the same reduction of cost provided to the user by the merchant management system 350 (FIGS. 3 and 4).

Although systems and methods for managing a system with adaptive pricing have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 5 may include different procedures, processes, and/or activities and be performed by many different modules, in many different orders.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a merchant management system comprising one or more processors and one or more non-transitory storage devices storing computing instructions configured to run on the one or more processors and perform acts of:
   determining one or more prospective products for a user to add to an electronic cart on a website of an online retailer; and
   for each respective prospective product of the one or more prospective products:
   identifying a respective prospective cart merchant group, the respective prospective cart merchant group comprising one or more respective prospective merchants that offer for sale the respective prospective product on the website of the online retailer;
   determining a respective prospectively-unlocked product group, the respective prospectively-unlocked product group comprising one or more respective products offered by the one or more respective prospective merchants that are discounted when the respective prospective product is added to the electronic cart; and
   determining a respective savings score of at least a portion of the respective prospectively-unlocked product group; and
   coordinating displaying to the user on the website of the online retailer (1) one or more respective prospective products of the one or more prospective products and (2) one or more respective savings scores of the at least the portion of the respective prospectively-unlocked product group.

2. The system of claim 1, wherein determining the respective savings score of the at least the portion of the respective prospectively-unlocked product group comprises:
   determining the respective savings score of the at least the portion of the respective prospectively unlocked product group based on at least one of:
   (1) a respective quantity of the one or more respective products in the at least the portion of the respective prospectively-unlocked product group;
   (2) a respective breadth of the one or more respective products in the at least the portion of the respective prospectively-unlocked product group; or
   (3) a respective quality of the one or more respective products in the at least the portion of the respective prospectively-unlocked product group.

3. The system of claim 2, wherein the one or more non-transitory storage devices storing the computing instructions are further configured to run on the one or more processors of the merchant management system and perform acts of:
   identifying one or more products in the electronic cart of the user;

identifying a current cart merchant group for the electronic cart of the user, the current cart merchant group comprising one or more current merchants that offer for sale the one or more products in the electronic cart of the user;

identifying a currently-unlocked product group, the currently-unlocked product group comprising one or more current products offered by the current cart merchant group; and for each respective prospective product of the one or more prospective products:
  comparing the respective prospectively-unlocked product group to the currently-unlocked product group to determine a respective modified unlocked product group, the respective modified unlocked product group comprising at least one respective product of the one or more respective products that is (1) in the respective prospectively-unlocked product group and (2) not in the currently-unlocked product group.

4. The system of claim 3, wherein:
the one or more non-transitory storage devices storing the computing instructions are further configured to run on the one or more processors of the merchant management system and perform an act of:
  determining a respective savings score of the respective modified unlocked product group based on at least one of:
    (1) a quantity of at least one product of the respective modified unlocked product group;
    (2) a breadth of the at least one product; or
    (3) a quality of the at least one product; and
coordinating displaying (1) the respective prospective product, and (2) the respective savings score of the at least the portion of the respective prospectively-unlocked product group comprises coordinating displaying to the user on the website of the online retailer (1) the respective prospective product, and (2) the respective savings score of the respective modified unlocked product group.

5. The system of claim 3, wherein:
the one or more non-transitory storage devices storing the computing instructions are further configured to run on the one or more processors of the merchant management system and perform an act of receiving from a client device a selection of the one or more products for placement in the electronic cart; and
coordinating displaying (1) the respective prospective product and (2) the respective savings score comprises coordinating displaying on the client device (1) the respective prospective product and (2) the respective savings score.

6. The system of claim 2, wherein:
determining the respective savings score comprises determining a respective savings score of the respective prospectively-unlocked product group based on at least one of (1) a quantity of the one or more products in the respective prospectively-unlocked product group, (2) a breadth of the one or more products in the respective prospectively-unlocked product group, or (3) a quality of the one or more products in the respectively-unlocked product group; and
coordinating displaying (1) the one or more respective prospective products of the one or more prospective products, and (2) the one or more respective savings scores of the at least the portion of the respective prospectively-unlocked product group comprises coordinating displaying to the user on the website of the online retailer (1) the one or more respective prospective products of the one or more prospective products, and (2) the one or more respective savings scores of the respective prospectively-unlocked product group.

7. The system of claim 1, wherein determining the one or more prospective products for the user to add to the electronic cart comprises determining the one or more prospective products for the user to add to the electronic cart based on an indication of an action by the user on the website of the online retailer.

8. The system of claim 1, wherein determining the one or more prospective products for the user to add to the electronic cart comprises determining the one or more prospective products for the user to add to the electronic cart independent of input from the user.

9. The system of claim 1, wherein:
the one or more prospective products comprise a plurality of prospective products;
coordinating displaying to the user on the website of the online retailer (1) the one or more respective prospective products of the one or more prospective products, and (2) the one or more respective savings scores of the at least the portion of the respective prospectively-unlocked product group comprises:
  coordinating displaying to the user on the website of the online retailer (1) a first prospective product of the plurality of prospective products, (2) a first savings score indicator representing a first savings score for the first prospective product, (3) a second prospective product of the plurality of prospective products, and (4) a second savings score indicator different from the first savings score indicator and representing a second savings score for the second prospective product when the second savings score is different than the first savings score; and
the one or more non-transitory storage devices storing the computing instructions are further configured to run on the one or more processors of the merchant management system and perform acts of:
  coordinating displaying first information of the first savings score when the user positions an input device over the first savings score indicator; and
  coordinating displaying second information of the second savings score when the user positions the input device over the second savings score indicator.

10. The system of claim 1, wherein:
the one or more prospective products comprise a plurality of prospective products;
determining the one or more prospective products for the user to add to the electronic cart comprises determining the one or more prospective products for the user to add to the electronic cart based on an indication of an action by the user on the website of the online retailer;
the one or more non-transitory storage devices storing the computing instructions are further configured to run on the one or more processors of the merchant management system and perform acts of:
  identifying one or more products in the electronic cart of the user;
  identifying a current cart merchant group for the electronic cart of the user, the current cart merchant group comprising one or more current merchants that offer for sale the one or more products in the electronic cart of the user;

identifying a currently-unlocked product group, the currently-unlocked product group comprising one or more current products offered by the current cart merchant group; and for each respective prospective product of the plurality of prospective products:
comparing the respective prospectively-unlocked product group to the currently-unlocked product group to determine a respective modified unlocked product group, the respective modified unlocked product group comprising at least one product of the one or more respective products that is (1) in the respective prospectively-unlocked product group and (2) not in the currently-unlocked product group;

determining the respective savings score comprises determining a savings score of the respective prospectively-unlocked product group based on at least one of:
(1) a quantity of the one or more products in the respective prospectively-unlocked product group;
(2) a breadth of the one or more products in the respective prospectively-unlocked product group; or
(3) a quality of the plurality of one or more products in the respective prospectively-unlocked product group;

coordinating displaying to the user on the website of the online retailer (1) the respective prospective product, and (2) the respective savings score of the at least the portion of the respective prospectively-unlocked product group comprises:
coordinating displaying to the user on the website of the online retailer (1) a first prospective product of the plurality of prospective products, (2) a first savings score indicator representing a first savings score for the first prospective product, (3) a second prospective product of the plurality of prospective products, and (4) a second savings score indicator different from the first savings score indicator and representing a second savings score for the second prospective product when the second savings score is different than the first savings score; and the one or more non-transitory storage devices storing the computing instructions are further configured to run on the one or more processors of the merchant management system and perform acts of:
coordinating displaying first information of the first savings score when the user positions an input device over the first savings score indicator; and
coordinating displaying second information of the second savings score when the user positions the input device over the second savings score indicator; and
receiving, from a client device of the user, a selection by the user of the one or more products for placement in the electronic cart; and
displaying the respective prospective product and the respective savings score for the respective prospective product.

11. The system of claim 1, wherein at least one of:
identifying the respective prospective cart merchant group comprises communicating between the merchant management system and one or more merchant systems to identify the one or more respective prospective merchants;
determining the respective prospectively-unlocked product group comprises communicating between the merchant management system and the one or more merchant systems to identify the one or more respective products offered by the one or more respective prospective merchants that are discounted when the respective prospective product is added to the electronic cart; and
determining the respective savings score comprises communicating between the merchant management system and the one or more merchant systems to identify the respective savings score.

12. A method comprising:
determining, with a merchant management system, one or more prospective products for a user to add to an electronic cart on a web site of an online retailer; and
for each respective prospective product of the one or more prospective products:
identifying, with the merchant management system, a respective prospective cart merchant group, the respective prospective cart merchant group comprising one or more respective prospective merchants that offer for sale the respective prospective product on the website of the online retailer;
determining, with the merchant management system, a respective prospectively-unlocked product group, the respective prospectively-unlocked product group comprising one or more respective products offered by the one or more respective prospective merchants that are discounted when the respective prospective product is added to the electronic cart; and
determining, with the merchant management system, a respective savings score of at least a portion of the respective prospectively-unlocked product group; and
coordinating, with the merchant management system, displaying to the user on the website of the online retailer (1) one or more respective prospective products of the one or more prospective products and (2) one or more respective savings scores of the at least the portion of the respective prospectively-unlocked product group.

13. The method of claim 12, wherein determining the respective savings score of the at least the portion of the respective prospectively-unlocked product group comprises:
determining the respective savings score of the at least the portion of the respective prospectively unlocked product group based on at least one of:
(1) a respective quantity of the one or more respective products in the at least the portion of the respective prospectively-unlocked product group;
(2) a respective breadth of the one or more respective products in the at least the portion of the respective prospectively-unlocked product group; or
(3) a respective quality of the one or more respective products in the at least the portion of the respective prospectively-unlocked product group.

14. The method of claim 13, wherein the method further comprises:
identifying, with the merchant management system, one or more products in the electronic cart of the user;
identifying, with the merchant management system, a current cart merchant group for the electronic cart of the user, the current cart merchant group comprising one or more current merchants that offer the one or more products in the electronic cart of the user;
identifying, with the merchant management system, a currently-unlocked product group, the currently-unlocked product group comprising one or more current products offered by the current cart merchant group; and for each prospective product of the one or more prospective products:

comparing, with the merchant management system, the respective prospectively-unlocked product group to the currently-unlocked product group to determine a respective modified unlocked product group, the respective modified unlocked product group comprising at least one respective product of the one or more respective products that is (1) in the respective prospectively-unlocked product group and (2) not in the currently-unlocked product group.

15. The method of claim 14, wherein:
the method further comprises
determining a respective savings score of the respective modified unlocked product group based on at least one of:
(1) a quantity of at least one product of the respective modified unlocked product group;
(2) a breadth of the at least one product; or
(3) a quality of the at least one product; and
coordinating displaying (1) the respective prospective product, and (2) the respective savings score of the at least the portion of the respective prospectively-unlocked product group comprises coordinating displaying to the user on the website of the online retailer (1) the respective prospective product, and (2) the respective savings score of the respective modified unlocked product group.

16. The method of claim 14, wherein:
the method further comprises receiving from a client device a selection of the one or more products for placement in the electronic cart; and
coordinating displaying (1) the respective prospective product and (2) the respective savings score comprises coordinating displaying on the client device (1) the respective prospective product and (2) the respective savings score.

17. The method of claim 13, wherein:
determining the respective savings score comprises determining a respective savings score of the respective prospectively-unlocked product group based on at least one of (1) a quantity of one or more products in the respective prospectively-unlocked product group, (2) a breadth of the one or more products in the respective prospectively-unlocked product group, or (3) a quality of the one or more products in the respective prospectively-unlocked product group; and
coordinating displaying (1) the one or more respective prospective products of the one or more prospective products, and (2) the one or more respective savings scores of the at least the portion of the respective prospectively-unlocked product group comprises coordinating displaying to the user on the website of the online retailer (1) the one or more respective prospective products of the one or more prospective products, and (2) the one or more respective savings scores of the respective prospectively-unlocked product group.

18. The method of claim 12, wherein determining the one or more prospective products for the user to add to the electronic cart comprises determining the one or more prospective products for the user to add to the electronic cart based on an indication of an action by the user on the website of the online retailer.

19. The method of claim 12, wherein determining the one or more prospective products for the user to add to the electronic cart comprises determining the one or more prospective products for the user to add to the electronic cart independent of input from the user.

20. The method of claim 12, wherein:
the one or more prospective products comprise a plurality of prospective products;
coordinating displaying to the user on the website of the online retailer (1) the one or more respective prospective products of the one or more prospective products, and (2) the one or more respective savings scores of the at least the portion of the respective prospectively-unlocked product group comprises:
coordinating displaying to the user on the website of the online retailer (1) a first prospective product of the plurality of prospective products, (2) a first savings score indicator representing a first savings score for the first prospective product, (3) a second prospective product of the plurality of prospective products, and (4) a second savings score indicator different from the first savings score indicator and representing a second savings score for the second prospective product when the second savings score is different than the first savings score; and
the method further comprises:
coordinating, with the merchant management system, displaying first information of the first savings score when the user positions an input device over the first savings score indicator; and
coordinating, with the merchant management system, displaying second information of the second savings score when the user positions the input device over the second savings score indicator.

21. The method of claim 12, wherein:
the one or more prospective products comprise a plurality of prospective products;
determining the one or more prospective products for the user to add to the electronic cart comprises determining the one or more prospective products for the user to add to the electronic cart based on an indication of an action by the user on the website of the online retailer;
the method further comprises:
identifying, with the merchant management system, one or more products in the electronic cart of the user;
identifying, with the merchant management system, a current cart merchant group for the electronic cart of the user, the current cart merchant group comprising one or more current merchants that offer the one or more products in the electronic cart of the user;
identifying, with the merchant management system, a currently-unlocked product group, the currently-unlocked product group comprising one or more current products offered for sale by the current cart merchant group; and
for each respective prospective product of the plurality of prospective products:
comparing, with the merchant management system, the respective prospectively-unlocked product group to the currently-unlocked product group to determine a respective modified unlocked product group, the respective modified unlocked product group comprising at least one product of the one or more respective products that is (1) in the respective prospectively-unlocked product group and (2) not in the currently-unlocked product group;

determining the respective savings score comprises determining a savings score of the respective prospectively-unlocked product group based on at least one of:
(1) a quantity of the one or more products in the respective prospectively-unlocked product group;
(2) a breadth of the one or more products in the respective prospectively-unlocked product group; or
(3) a quality of the one or more products in the respective prospectively-unlocked product group;

coordinating displaying to the user on the website of the online retailer (1) the respective prospective product, and (2) the respective savings score of the at least the portion of the respective prospectively-unlocked product group comprises:
  coordinating displaying to the user on the website of the online retailer (1) a first prospective product of the plurality of prospective products, (2) a first savings score indicator representing a first savings score for the first prospective product, (3) a second prospective product of the plurality of prospective products, and (4) a second savings score indicator different from the first savings score indicator and representing a second savings score for the second prospective product when the second savings score is different than the first savings score; and the method further comprises:
  coordinating, with the merchant management system, displaying first information of the first savings score when the user positions an input device over the first savings score indicator;
  coordinating, with the merchant management system, displaying second information of the second savings score when the user positions the input device over the second savings score indicator;
  receiving, from a client device of the user, a selection by the user of the one or more products for placement in the electronic cart; and
  coordinating, with the merchant management system, displaying the respective prospective product and the respective savings score for the respective prospective product on the client device of the user.

22. The method of claim 12 wherein:
identifying, with the merchant management system, the respective prospective cart merchant group comprises communicating between the merchant management system and one or more merchant systems to identify the one or more respective prospective merchants;
determining, with the merchant management system, the respective prospectively-unlocked product group comprises communicating between the merchant management system and the one or more merchant systems to identify the one or more respective products offered by the one or more respective prospective merchants that are discounted when the respective prospective product is added to the electronic cart; and
determining, with the merchant management system, the respective savings score comprises communicating between the merchant management system and the one or more merchant systems to identify the respective savings score.

* * * * *